United States Patent [19]

Linhart et al.

[11] Patent Number: 5,744,001
[45] Date of Patent: Apr. 28, 1998

[54] AQUEOUS PIGMENT SLURRIES FOR PRODUCTION OF FILLER-CONTAINING PAPER

[75] Inventors: Friedrich Linhart, Heidelberg; Dietmar Moench, Weinheim; Guenter Scherr, Ludwigshafen; Wolfgang Reuther, Heidelberg; Primoz Lorencak, Ludwigshafen, all of Germany

[73] Assignee: BASF Aktiengesellschaft, Ludwigshafen, Germany

[21] Appl. No.: 507,231

[22] PCT Filed: Feb. 19, 1994

[86] PCT No.: PCT/EP94/00480

§ 371 Date: Aug. 23, 1995

§ 102(e) Date: Aug. 23, 1995

[87] PCT Pub. No.: WO94/20681

PCT Pub. Date: Sep. 15, 1994

[30] Foreign Application Priority Data

Mar. 3, 1993 [DE] Germany .................. 43 06 608.9

[51] Int. Cl.$^6$ ............................................. D21H 17/69
[52] U.S. Cl. .......................... 162/164.3; 162/164.6; 162/168.2; 162/183; 106/401; 106/499
[58] Field of Search ................... 162/164.6, 169, 162/164.3, 183, 181.1, 181.2, 168.2; 106/465, 461, 499

[56] References Cited

U.S. PATENT DOCUMENTS

| | | | |
|---|---|---|---|
| 3,144,380 | 8/1964 | Drennen | 162/164.6 |
| 3,252,852 | 5/1966 | Lagally | 162/169 |
| 4,610,801 | 9/1986 | Matthews et al. | 162/181.2 |
| 4,711,727 | 12/1987 | Matthews et al. | 162/164.6 |
| 4,874,466 | 10/1989 | Savino | 162/164.6 |
| 5,076,846 | 12/1991 | Buri et al. | 106/499 |
| 5,244,542 | 9/1993 | Bown et al. | 162/181.2 |
| 5,372,747 | 12/1994 | Uhrig et al. | 106/499 |
| 5,384,013 | 1/1995 | Husband et al. | 162/164.6 |

FOREIGN PATENT DOCUMENTS

| | | |
|---|---|---|
| 1110019 | 10/1981 | Canada . |
| 1193111 | 2/1986 | European Pat. Off. . |
| 0227465 | 12/1986 | European Pat. Off. . |
| 0278602 | 1/1987 | European Pat. Off. . |
| 2115409 | 3/1971 | Germany . |
| 2125838 | 6/1983 | United Kingdom . |

*Primary Examiner*—Peter Chin
*Attorney, Agent, or Firm*—Oblon, Spivak, McClelland, Maier & Neustadt, P.C.

[57] ABSTRACT

Aqueous pigment slurries which contain up to 80% by weight of a finely divided pigment in dispersed form and from 0.1 to 5% by weight of dispersants which are obtainable by reacting (a) polyalkylenepolyamines, polyamidoamines, polyamidoamines grafted with ethyleneimine, polyetheramines and mixtures of the stated compounds and (b) monoethylenically unsaturated carboxylic acids, salts, esters, amides or nitriles of monoethylenically unsaturated carboxylic acids, chlorocarboxylic acids and/or glycidyl compounds and, if required, (c) bifunctional or polyfunctional crosslinking agents which have a halohydrin, glycidyl, aziridine or isocyanate unit or a halogen atom as a functional group, to give water-soluble condensates which, in 20% strength by weight aqueous solution at 20° C., have a viscosity of at least 100 mPa.s are prepared by milling or dispersing pigments in the presence of the dispersants and water and are used as additives to paper stock in the production of filler-containing paper.

4 Claims, No Drawings

AQUEOUS PIGMENT SLURRIES FOR PRODUCTION OF FILLER-CONTAINING PAPER

BACKGROUND OF THE INVENTION

1. Field of the Invention

The present invention relates to aqueous pigment slurries which contain up to 80% by weight of a finely divided pigment in dispersed form and from 0.1 to 5% by weight of at least one dispersant, processes for the preparation of the aqueous pigment slurries and the use of the pigment slurries as additives to the paper stock in the production of filler-containing paper.

2. Discussion of the Background

Concentrated aqueous pigment slurries are required in industry, for example for the preparation of paper coating slips. In order to be able to prepare highly concentrated aqueous pigment slurries having a low viscosity, a dispersant is required. Known dispersants are, for example, low molecular weight polyacrylic acids (cf. EP-B-0 002 771, which discloses a process for the preparation of low molecular weight polyacrylic acids).

Furthermore, U.S. Pat. No. 3,945,843 discloses that copolymers of methyl acrylate and acrylic acid are suitable as dispersants for the preparation of highly concentrated pigment slurries, such as calcium carbonate slurries. The pigment slurries have solids contents of from 50 to 80% by weight and are used for coating paper.

EP-B-0 194 621 discloses that, for the production of filler-containing papers, aqueous pigment slurries which contain from 40 to 80% by weight of a pigment in which the particle diameter of from 40 to 90% of the particles are less than 2 μm and from 0.1 to 2% by weight, based on the pigment, of a copolymer which contains esters of acrylic acid or methacrylic acid and at least one ethylenically unsaturated $C_3$–$C_5$-carboxylic acid as polymerized units are added to the stock suspension before sheet formation. The low molecular weight copolymers which act as dispersants have virtually no effect on the efficiency of drainage aids and retention aids in papermaking, whereas low molecular weight homopolymers of acrylic acid have a very adverse effect on the efficiency of drainage aids and retention aids in papermaking.

The non-prior published German Application P 42 44 194.3 discloses water-soluble condensates which are obtainable by reacting (a) polyalkylenepolyamines, polyamidoamines, polyamidoamines grafted with ethyleneimine, polyetheramines and mixtures of the stated compounds with (b) monoethylenically unsaturated carboxylic acids, salts, esters, amides or nitriles of monoethylenically unsaturated carboxylic acids, chlorocarboxylic acids and/or glycidyl compounds of the formula

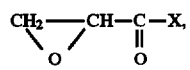

where
X is —$NH_2$, —OMe or —OR,
Me is H, Na, K or ammonium and
R is $C_1$–$C_4$-alkyl or $C_2$–$C_4$-hydroxyalkyl, and (c) bifunctional or polyfunctional crosslinking agents which have a halohydrin, glycidyl, aziridine or isocyanate unit or a halogen atom as a functional group, to give water-soluble condensates which, in 20% strength by weight aqueous solution at 20° C., have a viscosity of at least 100 mPa.s.

The condensates are used as drainage aids, flocculents and retention aids in papermaking.

SUMMARY OF THE INVENTION

It is an object of the present invention to provide pigment slurries which contain dispersants which do not adversely affect, or may even enhance, the efficiency of retention and drainage aids in the production of filler-containing papers.

We have found that this object is achieved, according to the invention, by aqueous paper slurries which contain up to 80% by weight of a finely divided pigment in dispersed form and from 0.1 to 5% by weight of at least one dispersant, if the dispersants used are reaction products which are obtainable by reacting (a) polyalkylenepolyamines, polyamidoamines, polyamidoamines grafted with ethyleneimine, polyetheramines and mixtures of the stated compounds with (b) monoethylenically unsaturated carboxylic acids, salts, esters, amides or nitriles of monoethylenically unsaturated carboxylic acids, chlorocarboxylic acids and/or glycidyl compounds of the formula

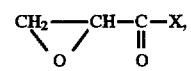

where
X is —$NH_2$, —OMe or —OR,
Me is H, Na, K or ammonium and
R is $C_1$–$C_4$-alkyl or $C_2$–$C_4$-hydroxyalkyl, and, if required, (c) bifunctional or polyfunctional crosslinking agents which have a halohydrin, glycidyl, aziridine or isocyanate unit or a halogen atom as a functional group, to give water-soluble condensates which, in 20% strength by weight aqueous solution at 20° C., have a viscosity of at least 100 mPa.s.

DETAILED DESCRIPTION OF THE PREFERRED EMBODIMENTS

The pigment slurries are prepared by milling pigments in the presence of the dispersants and water or dispersing finely divided pigments in water in the presence of the dispersants. The aqueous pigment slurries thus obtainable are used as additives to the paper stock in the production of filler-containing paper.

Suitable pigments are all pigments usually used in the paper industry, for example calcium carbonate (in the form of lime, chalk or precipitated chalk), talc, kaolin, bentonite, satin white, calcium sulfate and titanium dioxide. The pigments may be both filler pigments and coating pigments. The particle diameter of the pigments is preferably below 2 μm for from 40 to 90% of the pigment particles.

The aqueous pigment slurries are prepared, as a rule, at room temperature in a conventional apparatus, for example in a dissolver or a Caddy mill. Since high shear forces act on the mixture of pigment, water and dispersant during the dispersing process, the temperature of the pigment slurries may increase during the preparation.

Aqueous pigment slurries are also obtainable by milling coarse-particled pigments in the presence of dispersant and water. This method for the preparation of aqueous pigment slurries is particularly important for the preparation of highly concentrated chalk slurries.

According to the invention, the dispersants used are water-soluble condensates of the abovementioned components (a) and (b) and, if required, (c). For example, polyalkylenepolyamines are used as component (a) for the preparation of the dispersants. In the present context, polyalkylenepolyamines are to be understood as meaning compounds which contain at least 3 nitrogen atoms, e.g. diethylenetriamine, triethylenetetramine, tetraethylenepentamine, pentaethylenehexamine, diaminopropylethylenediamine, trisaminopropylamine and polyethyleneimines. The average molecular weight ($M_w$) of the polyethyleneimines is preferably at least 300 and may be up to 1000000. The use of polyethyleneimines having average molecular weights of from 1200 to 30000 is of particular interest industrially.

Further suitable compounds of group (a) are polyamidoamines. They are obtained, for example, in the reaction of dicarboxylic acids of 4 to 10 carbon atoms with polyalkylenepolyamines which preferably contain 3 to 10 basic nitrogen atoms in the molecule. Examples of suitable dicarboxylic acids are succinic acid, maleic acid, adipic acid, glutaric acid, suberic acid, sebacic acid and terephthalic acid. Mixtures of carboxylic acids may also be used, for example mixtures of adipic acid and glutaric acid or maleic acid and adipic acid. Adipic acid is preferably used for the preparation of the polyamidoamines. Suitable polyalkylenepolyamines which are subjected to a condensation reaction with the dicarboxylic acids have already been stated above, for example diethylenetriamine, triethylenetetramine, dipropylenetriamine, tripropylenetetramine, dihexamethylenetriamine, aminopropylethylenediamine and bisaminopropylethylenediamine. The polyalkylenepolyamines may also be used in the form of mixtures in the preparation of the polyamidoamines. The preparation of the polyamidoamines is preferably carried out in the absence of a solvent but may also be effected, if required, in inert solvents. The condensation of the dicarboxylic acids with the polyalkylenepolyamines is carried out at elevated temperatures, for example from 120° to 220° C. The water formed in the reaction is distilled off from the reaction mixture. The condensation may, if required, also be effected in the presence of lactones or lactams of carboxylic acids of 4 to 8 carbon atoms. Usually from 0.8 to 1.4 mol of a polyalkylenepolyamine are used per mole of dicarboxylic acid. The polyamidoamines thus obtainable have primary and secondary NH groups and are water-soluble.

Other suitable components (a) are polyamidoamines grafted with ethyleneimine. Products of this type can be prepared by allowing ethyleneimine to act on the polyamidoamines described above, in the presence of acids or Lewis acids, e.g. sulfuric acid, phosphoric acid or boron trifluoride etherate. Ethyleneimine is grafted onto the polyamidoamine under the conditions described. For example, from 1 to 10 ethyleneimine units may be grafted on per basic nitrogen group in the polyamidoamine, i.e. from about 10 to 500 parts by weight of ethyleneimine are used per 100 parts by weight of a polyamidoamine.

Further suitable compounds of group (a) are polyetheramines. Compounds of this type are disclosed, for example, in DE-2 916 356. As stated there, polyetheramines are obtained by subjecting di- and polyamines to a condensation reaction with chlorohydrin ethers at elevated temperatures. The polyamines may contain up to 10 nitrogen atoms. The chlorohydrin ethers are prepared, for example, by reacting dihydric alcohols of 2 to 5 carbon atoms, the alkoxylation products of these alcohols with up to 60 alkylene oxide units, glycerol or polyglycerol which contains up to 15 glyceryl units, erythritol or pentaerythritol with epichlorohydrin. From at least 2 to 8 mol of epichlorohydrin are used per mole of one of the stated alcohols. The reaction of the di- and polyamines with the chlorohydrin ethers is usually carried out at from 10° to 200° C.

Poletherpolyamines are furthermore obtained by subjecting diethanolamine or triethanolamine to a condensation reaction by a known process (cf. U.S. Pat. No. 4,404,362, U.S. Pat. No. 4,459,220 and U.S. Pat. No. 2,407,895).

The polyalkylenepolyamines described above may be partially amidated. Products of this type are prepared, for example, by reacting polyalkylenepolyamines with carboxylic acids, carboxylic esters, anhydrides or carbonyl halides. The polyalkylenepolyamines are preferably amidated to an extent of from 1 to 30%, generally only up to 20%, for the subsequent reactions. The amidated polyalkylenepolyamines must in fact still have free NH groups to enable them to be reacted with the compounds (b) and, if required, (c). For example, carboxylic acids of 1 to 28 carbon atoms may be used for the amidation of the polyalkylenepolyamines. Suitable carboxylic acids are, for example, formic acid, acetic acid, propionic acid, benzoic acid, lauric acid, palmitic acid, stearic acid, oleic acid, linoleic acid and behenic acid. An amidation can also be carried out, for example, by reacting the polyalkylenepolyamines with alkyldiketenes.

The polyalkylenepolyamines may also be used in partially quaternized form as compounds of group (a). Examples of suitable quaternizing agents are alkyl halides, such as methyl chloride, ethyl chloride, butyl chloride, epichlorohydrin or hexyl chloride, dimethyl sulfate, diethyl sulfate and benzyl chloride. If quaternized polyalkylenepolyamines are used as compounds of group (a), the degree of quaternization is preferably from 1 to 30%, usually only up to 20%, so that sufficient free NH groups are still available for the subsequent reactions.

Among the compounds of group (a), polyethyleneimines having an average molecular weight of from 1200 to 30000, polyamidoamines which are grafted with ethyleneimine and polyethyleneimines having a degree of amidation of not more than 20% are preferably used.

Monoethylenically unsaturated carboxylic acids which are suitable as component (b) have, for example, 3 to 18 carbon atoms in the molecule. Useful compounds of this type are, for example, acrylic acid, methacrylic acid, dimethacrylic acid, ethylacrylic acid, allylacetic acid, vinylacetic acid, maleic acid, fumaric acid, itaconic acid, methylenemalonic acid, citraconic acid, oleic acid and linolenic acid. From this group of acids, acrylic acid, methacrylic acid and maleic acid are preferably used. The salts of the monoethylenically unsaturated carboxylic acids, which are likewise suitable as compounds of group (b), are derived from the alkali metal, alkaline earth metal and ammonium salts of the stated acids. The sodium, potassium and ammonium salts are particularly important in practice. The ammonium salts may be derived both from ammonia and from amines or amine derivatives, such as ethanolamine, diethanolamine and triethanolamine. Among the alkaline earth metal salts, magnesium salts and calcium salts of the monoethylenically unsaturated carboxylic acids are particularly suitable.

The esters of the monoethylenically unsaturated carboxylic acids are derived, for example, from monohydric alcohols of 1 to 20 carbon atoms or dihydric alcohols of 2 to 6 carbon atoms, e.g. methyl acrylate, ethyl acrylate, n-propyl acrylate, isopropyl acrylate, n-butyl acrylate, isobutyl acrylate, methyl methacrylate, ethyl methacrylate, isopropyl methacrylate, n-butyl methacrylate, 2-ethylhexyl acrylate, 2-ethylhexyl methacrylate, palmityl acrylate, lauryl acrylate, diaryl acrylate, lauryl methacrylate, palmityl methacrylate and stearyl methacrylate, dimethyl maleate, diethyl maleate, isopropyl maleate, 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, hydroxybutyl acrylate, hydroxybutyl methacrylate, hydroxyhexyl acrylate and hydroxyethyl methacrylate.

Suitable amides of monoethylenically unsaturated carboxylic acids are, for example, acrylamide, methacrylamide and oleamide. Among the nitriles of monoethylenically unsaturated carboxylic acids, acrylonitrile and methacrylonitrile are particularly suitable.

Suitable chlorocarboxylic acids of group (b) are, for example, chloroacetic acid, 2-chloropropionic acid, 2-chlorobutyric acid, dichloroacetic acid and 2,2'-dichloropropionic acid.

Other suitable compounds of group (b) are glycidyl compounds of the formula

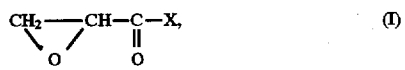

(I)

where

X is —$NH_2$, —OMe or —OR,

Me is H, Na, K or ammonium and

R is $C_1$–$C_4$-alkyl or $C_2$–$C_4$-hydroxyalkyl.

Individual compounds of the formula I are, for example, glycidic acid, its sodium, potassium, ammonium, magnesium or calcium salts, glycidamide and glycidic esters, such as methyl glycidate, ethyl glycidate, n-propyl glycidate, n-butyl glycidate, isobutyl glycidate, 2-ethylhexyl glycidate, 2-hydroxypropyl glycidate and 4-hydroxybutyl glycidate. Preferred compounds of the formula I are glycidic acid, its sodium, potassium and ammonium salts and glycidamide.

Preferably used compounds of group (b) are acrylic acid, methacrylic acid and maleic acid or mixtures of acrylic acid and maleic acid or methacrylic acid and maleic acid, in each case in any ratio.

Suitable compounds of group (c) are bifunctional or polyfunctional crosslinking agents which have a halohydrin, glycidyl, aziridine or isocyanate unit or halogen atom as a functional group. Examples of suitable crosslinking agents are epihalohydrins, in particular epichlorohydrin, and α,ω-bis(chlorohydrin)polyalkylene glycol ethers and the α,ω-bisepoxides of polyalkylene glycol ethers obtainable therefrom by treatment with bases. The chlorohydrin ethers are prepared, for example, by reacting polyalkylene glycols with epichlorohydrin in a molar ratio of from at least 1:2 to 1:5. Suitable polyalkylene glycols are, for example, polyethylene glycol, polypropylene glycol and polybutylene glycols and block copolymers of $C_2$–$C_4$-alkylene oxides. The average molecular weights ($M_w$) of the polyalkylene polyglycols are, for example, from 200 to 6000, preferably from 300 to 2000, g/mol. α,ω-bis(Chlorohydrin)polyalkylene glycol ethers of this type are described, for example, in U.S. Pat. No. 4,144,123. As also stated therein, the corresponding bisglycidyl ethers are formed from the dichlorohydrin ethers by treatment with bases.

Other suitable crosslinking agents are α,ω-dichloropolyalkylene glycols which, for example, are disclosed as crosslinking agents in EP-B-0 025 515. They are obtainable by either 1. reacting dihydric to tetrahydric alcohols, preferably alkoxylated dihydric to tetrahydric alcohols, with thionyl chloride with elimination of HCl and subsequent catalytic decomposition of the chlorosulfonated compounds with elimination of sulfur dioxide, or 2. converting said alcohols with phosgene, with elimination of HCl, into the corresponding bischlorocarbonic esters and obtaining α,ω-dichloroethers therefrom subsequently by catalytic decomposition with elimination of carbon dioxide.

Preferably used alcohol components are ethoxylated and/or propoxylated glycols, which are reacted with from 1 to 100, in particular from 4 to 40, mol of ethylene oxide per mole of glycol.

Other suitable crosslinking agents are α,ω-dichloroalkanes or vicinal dichloroalkanes, for example 1,2-dichloroethane, 1,2-dichloropropane, 1,3-dichloropropane, 1,4-dichlorobutane and 1,6-dichlorohexane. Examples of further crosslinking agents are the reaction products of at least trihydric alcohols with epichlorohydrin, which products have at least two chlorohydrin units; for example, glycerol, ethoxylated or propoxylated glycerols, polyglycerols having from 2 to 15 glycerol units in the molecule and polyglycerols which may be ethoxylated and/or propoxylated are used as polyhydric alcohols. Crosslinking agents of this type are disclosed, for example, in DE-C-2 916 356. Crosslinking agents which contain blocked isocyanate groups, for example trimethylhexamethylene diisocyanate blocked with 2,2,3,6-tetramethylpiperidin-4-one, are also suitable. These are known crosslinking agents (cf. for example DE-A-4 028 285) and crosslinking agents which contain aziridine units and are based on polyethers or substituted hydrocarbons, e.g. 1,6-bis-N-aziridinohexane (cf. U.S. Pat. No. 3,977,923). It is of course also possible to use mixtures of two or more crosslinking agents for increasing the molecular weight.

The water-soluble condensates which, according to the invention, are contained as dispersants in aqueous pigment slurries can be prepared by reacting the compounds of group (a) with the compounds of groups (b) and, if required, (c). The reaction can be carried out by first reacting the compounds of groups (a) and (b) before adding the compounds of group (c). However, it is also possible to react the compounds (b) and (c) simultaneously with the compounds (a). Efficient dispersants are already obtained in the reaction of the compounds (a) with (b). These reaction products may, as stated above, be modified by reaction with the crosslinking agents (c). In the two-stage and in the one-stage reaction, i.e. the reaction of (a) with (b), and where (c) may be concomitantly used, i.e. the reaction of (a), (b) and (c), as a rule elevated temperatures are employed, for example from 10° to 200° C., preferably from 30° to 100° C., to ensure that the reactions take place sufficiently rapidly. The reaction gives water-soluble condensates which have a viscosity of at least 100 mPa.s in 20% strength aqueous solution at 20° C. The viscosity of the novel condensates may be up to 100 Pa.s and is preferably from 200 to 2000 mPa.s (measured in 20% strength by weight aqueous solution at 20° C.).

Components (a), (b) and, if required, (c) may be used in any ratios. However, in order to obtain directly usable water-soluble condensates, the compounds (a) and (b) are used in a ratio such that from 20 to 99, preferably from 30 to 85, % of the primary and secondary amino groups of (a) remain unchanged in the reaction product of (a) and (b). If the compounds (c) are used, the ratio (a):(c) is from 1:0.001 to 1:10, preferably from 1:0.05 to 1:2.

In an embodiment of the process for the preparation of the water-soluble condensates, the compounds of group (a) are reacted with the compounds of group (b) and the reaction products are then reacted with the compounds (c) to give water-soluble condensates which have a viscosity of at least 100 mPa.s in 20% strength by 40 weight aqueous solution at 20° C. However, the compounds (b) and (c) may also be reacted simultaneously with the compounds of group (a). Those compounds of group (b) which contain a monoethylenically unsaturated double bond react with the compounds of group (a), in both process variants, by a Michael addition reaction, whereas chlorocarboxylic acids and the abovementioned glycidyl compounds of the formula I react with the primary or secondary amino groups of the compounds of group (a) via the chlorine group or the epoxy group.

Preferred aqueous pigment slurries are those which contain, as dispersants, reaction products which can be prepared by reacting (a) polyethyleneimines having an average molecular weight of from 1200 to 30 000 with (b) acrylic acid, methacrylic acid, maleic acid and/or itaconic acid in a ratio such that from 20 to 99% of the primary and secondary amino groups of the polyethyleneimines still remain unchanged in the reaction products of (a) and (b), said reaction products being modified, if required, by reaction with (c) epichlorohydrin, bisepoxides or bisepichlorohydrin ethers of polyethylene oxides and/or polypropylene oxides, each having an average molecular weight of from about 200 to 2000, in a weight ratio (a):(c) of from 1:0.01 to 1:10.

The aqueous pigment slurries contain the condensates described above, of components (a) and (b) and, if required, (c), in amounts of from 0.1 to 5, preferably from 0.2 to 2, % by weight. The aqueous pigment slurries are added to the paper stock prior to sheet formation in an amount such that the resulting filler-containing papers contain from 2 to 50, preferably from 5 to 30, % by weight of at least one pigment. The preparation of filler-containing papers is preferably additionally carried out in the presence of retention aids, which are used in conventional amounts. Preferably used retention aids are high molecular weight anionic polyacrylamides. The use of the aqueous pigment slurries as additives to the paper stock in the production of filler-containing paper results in an increase in the drainage rate and an increase in the retention compared with the addition of dispersant-free pigment slurries and of pigment slurries which contain a low molecular weight polyacrylic acid as a dispersant.

The novel aqueous pigment slurries can be used for the production of all filler-containing paper, board and cardboard qualities, for example newsprints, medium writing and printing papers, natural gravure printing papers and light-weight coated base papers. For the production of such papers, groundwood, thermomechanical pulp (TMP), chemothermomechanical pulp (CTMP), pressure groundwood (PGW) and sulfite and sulfate pulp are used as principle raw materials for the production of such papers.

In the examples which follow, parts and percentages are by weight.

EXAMPLES

Preparation of Dispersants

Dispersant 1

387 g of polyethyleneimine having an average molecular weight of 25 000 and 387 g of water are initially taken in a 2 l flask equipped with a stirrer and an apparatus for working under a nitrogen atmosphere and are heated to 80° C., and 92.65 g of acrylic acid are added in the course of 2 hours at this temperature. After the addition of the acrylic acid, the reaction mixture is stirred for 3 hours at 80° C. An aqueous solution having a solids content of 53% is obtained. In the case of the ratios used here, acrylic acid undergoes an addition reaction at 14.3% of the reactive nitrogen atoms in the polyethyleneimine.

Dispersant 2

395 g of polyethyleneimine having an average molecular weight of 25 000 and 920 g of water are initially taken in the apparatus described above and heated to 99° C., and 189 g of acrylic acid are added in the course of 75 minutes at this temperature. After the addition of the acrylic acid, the reaction mixture is stirred for a further 3 hours at 99° C. under a nitrogen atmosphere. At the ratios used, acrylic acid undergoes an addition reaction at 28.6% of the reactive nitrogen atoms in the polyethyleneimine. 1501 g of an aqueous solution having a solids content of 39.3% are obtained.

73 g of the aqueous solution of the adduct of acrylic acid with polyethyleneimine, described above, are diluted with 185 g of water and heated to 70° C., and 288.3 ml of a 20.5% strength aqueous solution of the bischlorohydrin ether of a polyethylene glycol having an average molecular weight of 1500 are added a little at a time at this temperature in the course of 2 hours. The pH is then brought to 8 by adding 6 g of 85% strength formic acid. 948 g of a 28.5% strength aqueous solution of the dispersant are obtained. A 20% strength aqueous solution has a viscosity of 660 mPa.s (measured in a Brookfield viscometer, spindle 2) at 20° C.

Dispersant 3

831 g of polyethyleneimine having an average molecular weight of 25 000 and 848 g of water are initially taken in a flask provided with a stirrer and equipped with an apparatus for working under a nitrogen atmosphere, the mixture is heated to 100° C. and 278 g of acrylic acid are added in the course of 2 hours at this temperature. After the addition of the acrylic acid, the reaction mixture is stirred for a further 3 hours at 100° C. Acrylic acid undergoes an addition reaction at 20% of the primary and secondary NH groups contained in the polyethyleneimine. 1950 g of an aqueous polymer solution having a solids content of 54.8% are obtained.

In a flask equipped with a stirrer and an apparatus for working under nitrogen, 355 g of the aqueous solution of the adduct, described above, of acrylic acid with polyethyleneimine are diluted with 583 g of water and heated to 70° C., and 52 ml of a 21% strength aqueous solution of the bischlorohydrin ether of polyethylene glycol having an average molecular weight of 400 are added a little at a time in the course of 2 hours at this temperature. 23 g of formic acid are then added, and 1009 g of an aqueous solution having a solids content of 20.7% are obtained. A 20% strength aqueous solution has a viscosity of 320 mPa.s (Brookfield viscometer, spindle 2) at 20° C.

Dispersant 4

For comparison with the prior art, a commercial solution of the sodium salt of a low molecular weight polyacrylic acid (Fikentscher K value=about 30) is used.

The following retention aids are used in papermaking.

Retention Aid 1

Modified polyamidoamine according to Example 3 of DE-B-2 434 816, prepared by grafting a polyamidoamine obtained from adipic acid and diethylenetriamine with ethyleneimine and crosslinking the grafted polyamidoamine with an α,ω-dichlorohydrin ether of a polyethylene glycol.

Retention Aid 2

Commercial water-in-oil emulsion of a high molecular weight copolymer of acrylamide and dimethylaminoethyl acrylate methochloride.

Retention Aid 3

Commercial water-in-oil emulsion of a high molecular weight copolymer of acrylamide and acrylic acid.

Examples 1 to 4

Preparation of Chalk Slurries

General Method 210 g of water and, in each case, an amount of an aqueous solution of dispersants 1 to 4 such that the amount of dispersant in each case is 0.3 or 0.5%, based on chalk, are initially taken in an 800 ml beaker. 490 g of a finely divided chalk (chalk DX1 from Omya) are then stirred in with a high-speed laboratory stirrer in the course of 10 minutes. After the addition of the total amount of chalk, the slurries are each stirred for 15 minutes at a speed of 2500 rpm and the viscosity of the slurry is then determined (Brookfield viscometer, spindle 1, 20° C.). The results are shown in Table 1.

TABLE 1

| Example | Comparative Example | Dispersant No. | Viscosity (mPa · s) 0.3 | 0.5 |
|---|---|---|---|---|
| 1 | | 1 | 300 | 170 |
| 2 | | 2 | 160 | 220 |
| 3 | | 3 | 280 | 225 |
| | 1 | 4 | 180 | 162 |
| | 2 | — | | 5600 |

The abovementioned chalk slurries are used for the production of filler-containing paper, and their effect on retention and drainage is determined. In each case, a paper stock consisting of 90 parts of TMP, 10 parts of bleached sulfate pulp and 40 parts of chalk from the chalk slurries shown in Tables 2 to 4 and according to Examples 1 to 4 is used for this purpose. The amounts of retention aid stated in Tables 2 to 4 are used in each case, and sheet formation is carried out on a Schopper-Riegler apparatus. The times stated in the tables were determined after the passage of 700 ml of filtrate in each case. The tables also show the optical transparency of the filtrates obtained.

TABLE 2

| Example | Comp. Example | Retention aid 1 (%) | Drainage time (sec. for 700 ml) 0 | 0.1 | 0.2 | Light transmittance (%) 0 | 0.1 | 0.2 |
|---|---|---|---|---|---|---|---|---|
| | | Chalk dispersed with | | | | | | |
| 4 | — | 0.3% of dispersant 1 | 82 | 48 | 44 | 19 | 41 | 48 |
| 5 | — | 0.5% of dispersant 2 | 71 | 45 | 39 | 25 | 42 | 49 |
| 6 | — | 0.5% of dispersant 3 | 74 | 45 | 38 | 35 | 51 | 56 |

TABLE 2-continued

| Example | Comp. Example | Retention aid 1 (%) | Drainage time (sec. for 700 ml) 0 | 0.1 | 0.2 | Light transmittance (%) 0 | 0.1 | 0.2 |
|---|---|---|---|---|---|---|---|---|
| | 3 | 0.3% of dispersant 4 | 88 | 83 | 72 | 6 | 11 | 21 |
| | 4 | without dispersant | 89 | 71 | 53 | 9 | 26 | 41 |

TABLE 3

| Example | Comp. Example | Retention aid 2 (%) | Drainage time (sec. for 700 ml) 0 | 0.05 | 0.1 | Light transmittance (%) 0 | 0.05 | 0.1 |
|---|---|---|---|---|---|---|---|---|
| | | Chalk dispersed with | | | | | | |
| 7 | — | 0.3% of dispersant 1 | 82 | 61 | 52 | 19 | 45 | 56 |
| 8 | — | 0.5% of dispersant 2 | 71 | 57 | 49 | 25 | 37 | 49 |
| 9 | — | 0.5% of dispersant 3 | 74 | 61 | 51 | 35 | 45 | 55 |
| | 5 | 0.3% of dispersant 4 | 88 | 72 | 66 | 6 | 17 | 28 |
| | 6 | without dispersant | 89 | 68 | 55 | 9 | 32 | 51 |

TABLE 4

| Example | Comp. Example | Retention aid 3 (%) | Drainage time (sec. for 700 ml) 0 | 0.05 | 0.1 | Light transmittance (%) 0 | 0.05 | 0.1 |
|---|---|---|---|---|---|---|---|---|
| | | Chalk dispersed with | | | | | | |
| 10 | — | 0.3% of dispersant 1 | 82 | 96 | 94 | 19 | 21 | 30 |
| 11 | — | 0.5% of dispersant 2 | 71 | 71 | 71 | 25 | 31 | 33 |
| 12 | — | 0.5% of dispersant 3 | 74 | 74 | 77 | 35 | 37 | 41 |
| | 7 | 0.3% of dispersant 4 | 88 | 88 | 87 | 6 | 17 | 24 |
| | 8 | without dispersant | 89 | 105 | 103 | 9 | 21 | 24 |

The values stated in Tables 2 to 4 for the drainage time and light transmittance show that the dispersants to be used according to the invention additionally act as retention aids and drainage aids.

We claim:

1. An aqueous pigment slurry which contains up to 80% by weight of a finely divided pigment selected from the group consisting of filler pigments and coating pigments, and mixtures thereof, in dispersed form and from 0.1 to 5% by weight of at least one dispersant, wherein the dispersants used are reaction products which are obtained by reacting (a) polyalkylenepolyamines, polyamidoamines, polyamidoamines grafted with ethyleneimine or mixtures thereof with (b) monoethylenically unsaturated carboxylic acids, salts, esters, amides or nitriles of monoethylenically unsaturated carboxylic acids, and, if required, (c) bifunctional or polyfunctional crosslinking agents which have a halohydrin, glycidyl, aziridine or isocyanate unit or a halogen atom as a functional group, and wherein (a) and (b) are present in a ratio such that from 20 to 99% of the primary and secondary amino groups of (a) remain unchanged in the reaction product of (a) and (b) and when (c) is present, the ratio (a):(c) is from 1:001 to 1:10, to give water-soluble condensates which, in 20% strength by weight aqueous solution at 20° C., have a viscosity of at least 100 mPa.s.

2. A process for the preparation of an aqueous pigment slurry as claimed in claim 1, wherein a pigment is milled in the presence of the dispersants and water or a finely divided pigment is dispersed in water in the presence of the dispersants.

3. The aqueous pigment slurry as claimed in claim 1, wherein (a) and (b) are present in a ratio such that from 30 to 85% of the primary and secondary amino groups of (a) remain unchanged in the reaction product of (a) and (b), and when (c) is present, the ratio of (a):(c) is from 1:0.05 to 1:2.

4. A method of preparing filler-containing paper, comprising the steps of:

combining an aqueous pigment slurry with a paper stock to form a pigmented paper stock; and forming paper sheets from said pigmented paper stock, wherein the aqueous pigment slurry contains up to 80% by weight of a finely divided pigment selected from the group consisting of filler pigments and coating pigments, and mixtures thereof, in dispersed form and from 0.1 to 5% by weight of at least one dispersant, wherein the dispersants used are reaction products which are obtained by reacting (a) polyalkylenepolyamines, polyamidoamines, polyamidoamines grafted with ethyleneimine or mixtures thereof with (b) monoethylenically unsaturated carboxylic acids, salts, esters, amides or nitriles of monoethylenically unsaturated carboxylic acids, and, if required, (c) bifunctional or polyfunctional crosslinking agents which have a halohydrin, glycidyl, aziridine or isocyanate unit or a halogen atom as a functional group, and wherein (a) and (b) are present in a ratio such that from 20 to 99% of the primary and secondary amino groups of (a) remain unchanged in the reaction product of (a) and (b) and when (c) is present, the ratio (a):(c) is from 1:001 to 1:10, to give water-soluble condensates which, in 20% strength by weight aqueous solution at 20° C., have a viscosity of at least 100 mPa.s.

* * * * *